June 14, 1949.   F. M. CLARK   2,473,242
HEAT-RESISTING CAPACITOR
Filed April 26, 1945

CONTAINS
MINERAL OIL
ADMIXED WITH
ABOUT 0.1 TO 1.0 PERCENT
OF BETA NAPHTHOL

Inventor:
Frank M. Clark,
by *Harry E. Dunham*
His Attorney.

Patented June 14, 1949

2,473,242

UNITED STATES PATENT OFFICE 2,473,242

HEAT-RESISTING CAPACITOR

Frank M. Clark, Pittsfield, Mass., assignor to General Electric Company, a corporation of New York Application April 26, 1945, Serial No. 590,371

4 Claims. (Cl. 175—41)

1

The present invention relates to electric capacitors which contain mineral oil as a dielectric material. Its object is to improve the length of life and operating characteristics of such capacitors.

Capacitors containing paper spacers which are impregnated with mineral oil operate with lives of satisfactory duration at temperatures which do not materially exceed about 80° C. However, when the temperature materially exceeds 80° C., such capacitors have short operating lives of unpredictable duration. For example, in a 1000 volt, direct current circuit in an environment resulting in a capacitor temperature of 110° C., the average useful life of such capacitors, as a rule, is less than about 200 hours, which is far too short a life for practical purposes.

The electrical industry increasingly demands capacitors adapted for operation at temperatures well above 80° C., as high as 130° C., and even higher temperature. It is desired that the operating life should be at least as long as 1000 hours.

I have discovered that capacitors containing mineral oil exhibit marked improvement in high temperature operating stability and in life duration when the mineral oil contains a small amount of beta naphthol, ordinarily within the limits of about one-tenth to one per cent by weight. For most purposes, an addition of about one-half per cent of beta naphthol is preferred.

Figure 1:
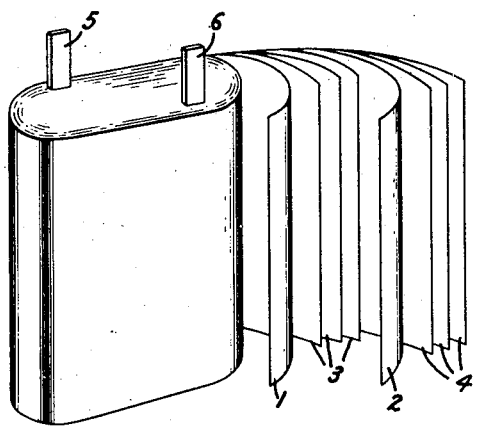
Figure 2:
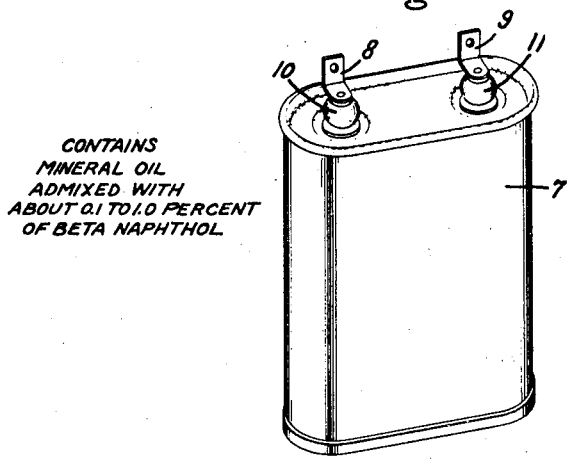

The accompanying drawing shows in Fig. 1 a front elevation of partly unrolled capacitor assembly; and Fig. 2 is a side elevation of a sealed capacitor.

The advantages accruing from the presence of beta naphthol in a mineral oil dielectric will be described in connection with capacitors containing paper spacers between the metal armatures.

The impregnating liquid is mineral oil containing a substantial amount of aromatic unsaturated compounds, as shown by a specific optical dispersion of about 110 to 120, and a color of yellow tinge of at least about one-fourth on the ASTM color scale. This type of mineral oil is refined by treatment with non-fuming sulphuric acid, and ordinarily with sulphuric acid of 60 to 80 per cent concentration. The oil is provided with beta naphthol stabilizer, ordinarily within a range of about 0.1 to 1.0 per cent.

Viscous or non-viscous Gulf Coast mineral

2 oils having the following characteristics may be employed with equal utility as the impregnant with an admixture of beta naphthol stabilizer:

| | Viscous Gulf Coast mineral oil | Non-viscous Gulf Coast mineral oil |
|---|---|---|
| Viscosity at 100° C | 95–105 sec. (S. U.). | 35–40 sec. (S. U.). |
| Viscosity at 37.8° C | | 98–108 sec. (S. U.). |
| Color (ASTM) | 1½ to 2½ | ¼ to 1. |
| Flash point deg. C | 235–245 | 150–160. |
| Fire point deg. C | 275–285 | 175–185. |
| Pour point deg. C | 0 to −7 | −35 to −45. |
| Specific Optical Dispersion | 118–120 | 115–118. |
| Specific Gravity, 15.5°/15.5° C | .900–.940 | .880–.900. |
| Reaction | neutral | neutral. |

Preliminary to introducing the impregnating composition, capacitor assemblies including cooperating capacitor members, such as shown in Fig. 1, are dried in a vacuum at a temperature of about 100 to 110° C. for about 48 hours in accordance with known technique. The capacitor assemblies consist of armatures 1, 2 which are separated by spacers consisting of a group of sheets 3, 4 of .0004 kraft paper. Three sheets of paper spacers are shown but a greater or lesser number may be used, depending on the service for which the capacitors are intended. The electrical connection strips 5, 6 are conventional. The impregnating liquid is introduced at about 75 to 100° C. after being freed from dissolved air as by a vacuum treatment. The dried capacitors during impregnation preferably are held at about 100 to 110° C. in an evacuated space. While still immersed in the treating liquid under vacuum, the capacitors are cooled to room temperature. Upon removal from the treating tank, the capacitors are sealed hermetically in a casing or container 7 as shown in Fig. 2 and then are ready for operation. The hermetical sealing of the capacitor is necessary in order to prevent the entrance and absorption of air, the presence of which will lead to dielectric and chemical deterioration.

The terminal strips 5, 6 are connected electrically to external terminals 8, 9 which are insulated from the sealed casing 7 by glass insulators 10, 11.

Capacitors constructed and impregnated with mineral oil containing beta naphthol may be operated on direct current circuits with impressed potential of 1000 volts at a temperature of 110° C. with useful lives of more than 3000 hours. Similar capacitors devoid of stabilizer under such conditions would have useful lives of less than 200 hours.

On alternating current circuits, similar surprising and satisfactory results are obtained. In an ambient temperature of 100° C., capacitors containing about .5 per cent of beta naphthol in the mineral oil impregnant have a life indefinitely longer than 150 days under a voltage stress of 460 volts per mil. Under similar conditions of test, the capacitors impregnated with the unmodified mineral oil show failures beginning only 19 days after being placed under voltage.

In capacitors embodying my invention, little or no material change in capacity is observable when the temperature of such capacitors is varied over the ordinary operating range of temperatures. When even only one-fourth per cent beta naphthol is present in a mineral oil dielectric impregnant, the capacity remains unchanged over a temperature range of 25 to 125° C.

The insulation resistance of capacitors which is the product of the resistivity in megohms and the capacity in microfarads ordinarily has been considered as an indication of the suitability of a capacity dielectric for use on direct current voltage circuits. Care has been taken to choose only capacitors having an insulation resistance at least as high as about 4000 megohms times microfarads. As a radical reduction in insulation resistance accompanies the modification of a dielectric having a high resistivity, such as mineral oil, with a material having a relatively low resistivity, such as beta naphthol, it is surprising that nevertheless the life of capacitors containing mineral oil modified with beta naphthol is increased despite the fact that from experience with other dielectrics a marked decrease in life might be expected.

The presence of one-half of one per cent of beta naphthol in mineral oil results in a marked decrease in the resistivity of the oil. At 25° C., this decrease is about 80 per cent and at 100° C. is about 60 per cent. Smaller percentages of beta naphthol result in a lesser but still substantial decrease in oil resistivity. Even one-tenth per cent beta naphthol results in a marked reduction, for example, from about $33 \times 10^{12}$ ohms to about $5 \times 10^{12}$ ohms per centimeter cubed measured at 100° C. The addition of one-half per cent of beta naphthol reduces the resistivity of the oil to about $1.5 \times 10^{12}$ ohms per cm.$^3$.

Surprisingly, capacitors treated with mineral oil containing a small amount of beta naphthol all show an increase in capacitor insulation resistance during a period of operation of several hundred hours. When about one-tenth per cent of beta naphthol is present, the insulation at the end of about 500 hours of operation has become slightly greater than the initial insulation resistance of a similar capacitor impregnated with mineral oil devoid of beta naphthol or other modifier. The power factor of capacitors when operated on alternating current circuits is substantially not affected by the presence of small amounts of beta naphthol stabilizer, that is, not greater than about one per cent.

The stabilizing effect of the beta naphthol appears to be related to the effect of electric stress on the mineral oil at elevated temperatures. As the oil is sealed from contact with the atmosphere, the beta naphthol apparently does not function as an anti-oxidant.

What I claim as new and desire to secure by Letters Patent in the United States is:

1. An electric capacitor comprising the combination of an hermetically sealed container, and cooperating capacitor members therein including a dielectric composition consisting of mineral oil containing by weight about 0.1 to 1.0 per cent of beta naphthol, whereby the life of such capacitor at a temperature of about 100° C. is materially longer than that of a similar capacitor unassociated with beta naphthol.

2. An electric capacitor comprising the combination of an hermetically sealed container, and cooperating capacitor members therein including a dielectric composition consisting of mineral oil containing by weight about 0.5 per cent beta naphthol.

3. An hermetically sealed electric capacitor characterized by operating stability and long life at elevated temperatures, consisting of the combination of cooperating capacitor members including a mineral oil dielectric material containing aromatic unsaturated compounds, and about one-tenth to one per cent of beta naphthol in said oil.

4. An electric capacitor comprising the combination of armatures and a cooperating mineral oil dielectric material therebetween in a container hermetically sealed from the atmosphere, the dielectric material containing aromatic unsaturated compounds, and about one-tenth to one per cent of beta naphthol to increase the operating stability of the capacitor at elevated temperatures for a prolonged period of time.

FRANK M. CLARK.

REFERENCES CITED

The following references are of record in the file of this patent:

UNITED STATES PATENTS

| Number | Name | Date |
|---|---|---|
| 1,793,134 | Rogers | Feb. 17, 1931 |
| 1,871,927 | Sullivan, Jr. | Aug. 16, 1932 |
| 1,966,163 | Clark | July 10, 1934 |
| 1,991,779 | Ayres | Feb. 19, 1935 |
| 2,000,105 | Story | May 7, 1935 |
| 2,069,273 | Rosen | Feb. 2, 1937 |
| 2,191,338 | Clark | Feb. 20, 1940 |
| 2,235,566 | Ruben | Mar. 18, 1941 |
| 2,264,893 | Shoemaker | Dec. 2, 1941 |
| 2,264,896 | Bahlke | Dec. 2, 1941 |

FOREIGN PATENTS

| Number | Country | Date |
|---|---|---|
| 542,834 | Great Britain | Jan. 29, 1942 |